US009749245B2

(12) United States Patent
Stalling et al.

(10) Patent No.: US 9,749,245 B2
(45) Date of Patent: Aug. 29, 2017

(54) METHOD AND SYSTEM FOR TRANSFERRING DATA TO IMPROVE RESPONSIVENESS WHEN SENDING LARGE DATA SETS

(71) Applicant: PME IP PTY LTD., Richmond, Victoria (AU)

(72) Inventors: Detlev Stalling, Berlin (DE); Malte Westerhoff, Berlin (DE)

(73) Assignee: PME IP PTY LTD, Richmond (AU)

(*) Notice: Subject to any disclaimer, the term of this patent is extended or adjusted under 35 U.S.C. 154(b) by 0 days.

(21) Appl. No.: 15/361,038

(22) Filed: Nov. 24, 2016

(65) Prior Publication Data

US 2017/0078205 A1    Mar. 16, 2017

Related U.S. Application Data

(63) Continuation of application No. 13/831,982, filed on Mar. 15, 2013, now Pat. No. 9,509,802.

(51) Int. Cl.
*G06F 15/16* (2006.01)
*H04L 12/801* (2013.01)
(Continued)

(52) U.S. Cl.
CPC ........ *H04L 47/127* (2013.01); *H04L 43/0894* (2013.01); *H04L 47/10* (2013.01);
(Continued)

(58) Field of Classification Search
CPC ....... H04L 47/127; H04L 47/12; H04L 47/27; H04L 43/0894; H04L 69/04; G06F 5/06; G06F 5/065
(Continued)

(56) References Cited

U.S. PATENT DOCUMENTS 2,658,310 A    11/1953    Cook
3,431,200 A    3/1969    Davis
(Continued)

FOREIGN PATENT DOCUMENTS

DE    10317384    4/2004
EP    0492897    7/1992
(Continued)

OTHER PUBLICATIONS

ATI Website Index, http://www.ati.com/developer/index.html, Dec. 20, 2002, 2 pages.
(Continued)

*Primary Examiner* — Joseph E Avellino
*Assistant Examiner* — Patrick Ngankam
(74) *Attorney, Agent, or Firm* — Sci-Law Strategies, PC

(57) ABSTRACT

Most of the internet traffic today is carried out via the Transmission Control Protocol (TCP). The main advantage of TCP is that it provides reliable data transfer to the application layer and simplifies programming. The protocol maximizes data throughput but may also lead to noticeable transmission delay in wide area networks (WAN). A client-server based medical image viewing system is disclosed that achieves high data throughput over TCP without impacting responsiveness. Special timestamp messages inserted into the data stream allow the system to detect situations where network latency increases noticeably and to obtain a reliable estimate of sustained transfer bandwidth. The system applies a feedback scheme that avoids network delays by limiting send bandwidth. In addition other parameters, in particular image compression settings, are dynamically adjusted depending on current network quality.

18 Claims, 2 Drawing Sheets

(51) Int. Cl.
*H04L 29/06* (2006.01)
*H04L 12/26* (2006.01)
*H04L 12/807* (2013.01)
*H04L 12/729* (2013.01)
*H04L 12/727* (2013.01)

(52) U.S. Cl.
CPC .............. *H04L 47/12* (2013.01); *H04L 47/27* (2013.01); *H04L 67/42* (2013.01); *H04L 69/04* (2013.01); *H04L 69/163* (2013.01); *H04L 45/121* (2013.01); *H04L 45/125* (2013.01)

(58) Field of Classification Search
USPC ........................................................ 709/203
See application file for complete search history.

(56) References Cited

U.S. PATENT DOCUMENTS

| | | |
|---|---|---|
| 3,645,040 A | 2/1972 | Ort |
| 4,137,868 A | 2/1979 | Pryor |
| 4,235,043 A | 11/1980 | Harasawa et al. |
| 4,258,661 A | 3/1981 | Margen |
| 4,267,038 A | 5/1981 | Thompson |
| 4,320,594 A | 3/1982 | Raymond |
| 4,746,795 A | 5/1988 | Stewart et al. |
| 4,905,148 A | 2/1990 | Crawford |
| 4,910,912 A | 3/1990 | Lowrey, III |
| 4,928,250 A | 5/1990 | Greenberg et al. |
| 4,958,460 A | 9/1990 | Nielson et al. |
| 4,984,160 A | 1/1991 | Saint Felix et al. |
| 5,031,117 A | 7/1991 | Minor et al. |
| 5,091,960 A | 2/1992 | Butler |
| 5,121,708 A | 6/1992 | Nuttle |
| 5,128,864 A | 7/1992 | Waggener et al. |
| 5,218,534 A | 6/1993 | Trousset et al. |
| 5,235,510 A | 8/1993 | Yamada |
| 5,241,471 A | 8/1993 | Trousset et al. |
| 5,253,171 A | 10/1993 | Hsiao et al. |
| 5,274,759 A | 12/1993 | Yoshioka |
| 5,280,428 A | 1/1994 | Wu et al. |
| 5,287,274 A | 2/1994 | Saint Felix et al. |
| 5,293,313 A | 3/1994 | Cecil |
| 5,307,264 A | 4/1994 | Waggener et al. |
| 5,355,453 A | 10/1994 | Row et al. |
| 5,368,033 A | 11/1994 | Moshfeghi |
| 5,375,156 A | 12/1994 | Kuo-Petravic et al. |
| 5,412,703 A | 5/1995 | Goodenough et al. |
| 5,412,764 A | 5/1995 | Tanaka |
| 5,442,672 A | 8/1995 | Bjorkholm et al. |
| 5,452,416 A | 9/1995 | Hilton |
| 5,488,700 A | 1/1996 | Glassner |
| 5,560,360 A | 10/1996 | Filler |
| 5,594,842 A | 1/1997 | Kaufman et al. |
| 5,602,892 A | 2/1997 | Llacer |
| 5,633,951 A | 5/1997 | Moshfeghi |
| 5,633,999 A | 5/1997 | Clowes et al. |
| 5,640,436 A | 6/1997 | Kawai et al. |
| 5,671,265 A | 9/1997 | Andress |
| 5,744,802 A | 4/1998 | Muehllehner et al. |
| 5,774,519 A | 6/1998 | Lindstrom et al. |
| 5,790,787 A | 8/1998 | Scott et al. |
| 5,793,374 A | 8/1998 | Guenter et al. |
| 5,793,879 A | 8/1998 | Benn et al. |
| 5,813,988 A | 9/1998 | Alfano et al. |
| 5,821,541 A | 10/1998 | Tumer |
| 5,825,842 A | 10/1998 | Taguchi |
| 5,838,756 A | 11/1998 | Taguchi et al. |
| 5,841,140 A | 11/1998 | Mc Croskey et al. |
| 5,909,476 A | 6/1999 | Cheng et al. |
| 5,930,384 A | 7/1999 | Guillemaud et al. |
| 5,931,789 A | 8/1999 | Alfano et al. |
| 5,950,203 A | 9/1999 | Stakuis |
| 5,960,056 A | 9/1999 | Lai |
| 5,963,612 A | 10/1999 | Navab |
| 5,963,613 A | 10/1999 | Navab |
| 5,963,658 A | 10/1999 | Klibanov et al. |
| 6,002,739 A | 12/1999 | Heumann |
| 6,018,562 A | 1/2000 | Willson |
| 6,032,264 A | 2/2000 | Beffa et al. |
| 6,044,132 A | 3/2000 | Navab |
| 6,049,390 A | 4/2000 | Notredame |
| 6,049,582 A | 4/2000 | Navab |
| 6,072,177 A | 6/2000 | Mccroskey et al. |
| 6,088,423 A | 7/2000 | Krug et al. |
| 6,091,422 A | 7/2000 | Ouaknine et al. |
| 6,104,827 A | 8/2000 | Benn et al. |
| 6,105,029 A | 8/2000 | Maddalozzo, Jr. et al. |
| 6,108,007 A | 8/2000 | Shochet |
| 6,108,576 A | 8/2000 | Alfano et al. |
| 6,123,733 A | 9/2000 | Dalton |
| 6,175,655 B1 | 1/2001 | George |
| 6,205,120 B1* | 3/2001 | Packer .................... H04L 47/10 370/235 |
| 6,219,061 B1 | 4/2001 | Lauer et al. |
| 6,226,005 B1 | 5/2001 | Laferriere |
| 6,236,704 B1 | 5/2001 | Navab et al. |
| 6,243,098 B1 | 6/2001 | Lauer et al. |
| 6,249,594 B1 | 6/2001 | Hibbard |
| 6,255,655 B1 | 7/2001 | Mc Croskey et al. |
| 6,264,610 B1 | 7/2001 | Zhu |
| 6,268,846 B1 | 7/2001 | Georgiev |
| 6,278,460 B1 | 8/2001 | Myers et al. |
| 6,282,256 B1 | 8/2001 | Grass et al. |
| 6,289,235 B1 | 9/2001 | Webber et al. |
| 6,304,771 B1 | 10/2001 | Yodh et al. |
| 6,320,928 B1 | 11/2001 | Vaillant et al. |
| 6,324,241 B1 | 11/2001 | Besson |
| 6,377,257 B1 | 4/2002 | Borrel |
| 6,377,266 B1 | 4/2002 | Baldwin |
| 6,384,821 B1 | 5/2002 | Borrel |
| 6,404,843 B1 | 6/2002 | Vaillant |
| 6,415,013 B1 | 7/2002 | Hsieh et al. |
| 6,470,067 B1 | 10/2002 | Harding |
| 6,470,070 B2 | 10/2002 | Menhardt |
| 6,473,793 B1* | 10/2002 | Dillon ................ H04B 7/18584 370/235 |
| 6,475,150 B2 | 11/2002 | Haddad |
| 6,507,633 B1 | 1/2003 | Elbakri et al. |
| 6,510,241 B1 | 1/2003 | Vaillant et al. |
| 6,519,355 B2 | 2/2003 | Nelson |
| 6,526,305 B1 | 2/2003 | Mori |
| 6,559,958 B2 | 5/2003 | Motamed |
| 6,591,004 B1 | 7/2003 | VanEssen et al. |
| 6,615,063 B1 | 9/2003 | Ntziachristos et al. |
| 6,633,688 B1 | 10/2003 | Nixon |
| 6,636,623 B2 | 10/2003 | Nelson et al. |
| 6,654,012 B1 | 11/2003 | Lauer et al. |
| 6,658,142 B1 | 12/2003 | Kam et al. |
| 6,664,963 B1 | 12/2003 | Zatz |
| 6,674,430 B1 | 1/2004 | Kaufman et al. |
| 6,697,508 B2 | 2/2004 | Nelson |
| 6,707,878 B2 | 3/2004 | Claus et al. |
| 6,718,195 B2 | 4/2004 | Van Der Mark et al. |
| 6,731,283 B1 | 5/2004 | Navab |
| 6,740,232 B1 | 5/2004 | Beaulieu |
| 6,741,730 B2 | 5/2004 | Rahn et al. |
| 6,744,253 B2 | 6/2004 | Stolarczyk |
| 6,744,845 B2 | 6/2004 | Harding et al. |
| 6,745,070 B2 | 6/2004 | Wexler et al. |
| 6,747,654 B1 | 6/2004 | Laksono et al. |
| 6,754,299 B2 | 6/2004 | Patch |
| 6,765,981 B2 | 7/2004 | Heumann |
| 6,768,782 B1 | 7/2004 | Hsieh et al. |
| 6,770,893 B2 | 8/2004 | Nelson |
| 6,771,733 B2 | 8/2004 | Katsevich |
| 6,778,127 B2 | 8/2004 | Stolarczyk et al. |
| 6,785,409 B1 | 8/2004 | Suri |
| 6,798,417 B1 | 9/2004 | Taylor |
| 6,807,581 B1 | 10/2004 | Starr et al. |
| 6,825,840 B2 | 11/2004 | Gritz |
| 6,825,843 B2 | 11/2004 | Allen et al. |
| 6,923,906 B2 | 8/2005 | Oswald et al. |
| 6,947,047 B1 | 9/2005 | Moy et al. |
| 6,978,206 B1 | 12/2005 | Pu |

(56) References Cited

U.S. PATENT DOCUMENTS

| | | |
|---|---|---|
| 7,003,547 B1 | 2/2006 | Hubbard |
| 7,006,101 B1 | 2/2006 | Brown et al. |
| 7,031,022 B1 | 4/2006 | Komori et al. |
| 7,034,828 B1 | 4/2006 | Drebin et al. |
| 7,039,723 B2 | 5/2006 | Hu |
| 7,050,953 B2 | 5/2006 | Chiang et al. |
| 7,054,852 B1 | 5/2006 | Cohen |
| 7,058,644 B2 | 6/2006 | Patchet et al. |
| 7,076,735 B2 | 7/2006 | Callegari |
| 7,098,907 B2 | 8/2006 | Houston et al. |
| 7,120,283 B2 | 10/2006 | Thieret |
| 7,133,041 B2 | 11/2006 | Kaufman et al. |
| 7,154,985 B2 | 12/2006 | Dobbs |
| 7,167,176 B2 | 1/2007 | Sloan et al. |
| 7,184,041 B2 | 2/2007 | Heng et al. |
| 7,185,003 B2 | 2/2007 | Bayliss et al. |
| 7,219,085 B2 | 5/2007 | Buck et al. |
| 7,242,401 B2 | 7/2007 | Yang et al. |
| 7,262,770 B2 | 8/2007 | Sloan et al. |
| 7,274,368 B1 | 9/2007 | Keslin |
| 7,299,232 B2 | 11/2007 | Stakutis et al. |
| 7,315,926 B2 | 1/2008 | Fridella et al. |
| 7,324,116 B2 | 1/2008 | Boyd et al. |
| 7,339,585 B2 | 3/2008 | Verstraelen et al. |
| 7,472,156 B2 | 12/2008 | Philbrick et al. |
| 7,502,869 B2 | 3/2009 | Boucher et al. |
| 7,506,375 B2 | 3/2009 | Kanda et al. |
| 7,552,192 B2 | 6/2009 | Carmichael |
| 7,609,884 B1 | 10/2009 | Stalling |
| 7,693,318 B1 | 4/2010 | Stalling |
| 7,701,210 B2 | 4/2010 | Ichinose |
| 7,778,392 B1 | 8/2010 | Bergman |
| 7,876,944 B2 | 1/2011 | Stalling |
| 7,899,516 B2 | 3/2011 | Chen et al. |
| 7,956,612 B2 | 6/2011 | Sorensen |
| 7,983,300 B2 * | 7/2011 | Vaughan ............... H04L 12/66 370/468 |
| 7,991,837 B1 | 8/2011 | Tahan |
| 7,995,824 B2 | 8/2011 | Yim |
| 8,107,592 B2 | 1/2012 | Bergman |
| 8,189,002 B1 | 5/2012 | Westerhoff |
| 8,319,781 B2 | 11/2012 | Westerhoff |
| 8,369,600 B2 | 2/2013 | Can et al. |
| 8,386,560 B2 | 2/2013 | Ma |
| 8,392,529 B2 | 3/2013 | Westerhoff |
| 8,508,539 B2 | 8/2013 | Vlietinck |
| 8,542,136 B1 * | 9/2013 | Owsley ............... H03M 7/3059 341/50 |
| 8,548,215 B2 | 10/2013 | Westerhoff |
| 8,775,510 B2 | 7/2014 | Westerhoff |
| 8,976,190 B1 | 3/2015 | Westerhoff |
| 9,019,287 B2 | 4/2015 | Westerhoff |
| 9,167,027 B2 | 10/2015 | Westerhoff |
| 9,299,156 B2 | 3/2016 | Zalis |
| 9,355,616 B2 | 5/2016 | Westerhoff |
| 9,454,813 B2 | 9/2016 | Westerhoff |
| 9,509,802 B1 | 11/2016 | Westerhoff |
| 9,524,577 B1 | 12/2016 | Westerhoff |
| 2001/0026848 A1 | 10/2001 | Van Der Mark |
| 2002/0016813 A1 | 2/2002 | Woods et al. |
| 2002/0034817 A1 | 3/2002 | Henry et al. |
| 2002/0049825 A1 | 4/2002 | Jewett et al. |
| 2002/0080143 A1 | 6/2002 | Morgan et al. |
| 2002/0089587 A1 * | 7/2002 | White ............... G11B 27/034 348/105 |
| 2002/0099290 A1 | 7/2002 | Haddad |
| 2002/0099844 A1 | 7/2002 | Baumann et al. |
| 2002/0120727 A1 * | 8/2002 | Curley ............... H04L 41/12 709/223 |
| 2002/0123680 A1 | 9/2002 | Vaillant |
| 2002/0138019 A1 | 9/2002 | Wexler |
| 2002/0150202 A1 | 10/2002 | Harding |
| 2002/0150285 A1 | 10/2002 | Nelson |
| 2002/0180747 A1 | 12/2002 | Lavelle et al. |
| 2002/0184238 A1 | 12/2002 | Chylla |
| 2002/0184349 A1 | 12/2002 | Maukyan |
| 2003/0001842 A1 | 1/2003 | Munshi |
| 2003/0031352 A1 | 2/2003 | Nelson et al. |
| 2003/0059110 A1 | 3/2003 | Wilt |
| 2003/0065268 A1 | 4/2003 | Chen et al. |
| 2003/0086599 A1 | 5/2003 | Armato |
| 2003/0103666 A1 | 6/2003 | Edie et al. |
| 2003/0120743 A1 | 6/2003 | Coatney et al. |
| 2003/0123720 A1 | 7/2003 | Launav et al. |
| 2003/0149812 A1 | 8/2003 | Schoenthal et al. |
| 2003/0158786 A1 | 8/2003 | Yaron |
| 2003/0176780 A1 | 9/2003 | Arnold |
| 2003/0179197 A1 | 9/2003 | Sloan et al. |
| 2003/0194049 A1 | 10/2003 | Claus et al. |
| 2003/0220569 A1 | 11/2003 | Dione |
| 2003/0220772 A1 | 11/2003 | Chiang et al. |
| 2003/0227456 A1 | 12/2003 | Gritz |
| 2003/0234791 A1 | 12/2003 | Boyd et al. |
| 2004/0010397 A1 | 1/2004 | Barbour et al. |
| 2004/0012596 A1 | 1/2004 | Allen et al. |
| 2004/0015062 A1 | 1/2004 | Ntziachristos et al. |
| 2004/0022348 A1 | 2/2004 | Heumann |
| 2004/0059822 A1 | 3/2004 | Jiang |
| 2004/0066384 A1 | 4/2004 | Ohba |
| 2004/0066385 A1 | 4/2004 | Kilgard |
| 2004/0066891 A1 | 4/2004 | Freytag |
| 2004/0102688 A1 | 5/2004 | Walker |
| 2004/0125103 A1 | 7/2004 | Kaufman |
| 2004/0133652 A1 | 7/2004 | Miloushev et al. |
| 2004/0147039 A1 | 7/2004 | Van Der Mark |
| 2004/0162677 A1 | 8/2004 | Bednar |
| 2004/0170302 A1 | 9/2004 | Museth et al. |
| 2004/0210584 A1 | 10/2004 | Nir et al. |
| 2004/0215858 A1 | 10/2004 | Armstrong et al. |
| 2004/0215868 A1 | 10/2004 | Solomon et al. |
| 2004/0239672 A1 | 12/2004 | Schmidt |
| 2004/0240753 A1 | 12/2004 | Hu |
| 2005/0012753 A1 | 1/2005 | Karlov |
| 2005/0017972 A1 | 1/2005 | Poole et al. |
| 2005/0066095 A1 | 3/2005 | Mullick et al. |
| 2005/0088440 A1 | 4/2005 | Sloan et al. |
| 2005/0128195 A1 | 6/2005 | Houston et al. |
| 2005/0152590 A1 | 7/2005 | Thieret |
| 2005/0225554 A1 | 10/2005 | Bastos et al. |
| 2005/0231503 A1 | 10/2005 | Heng et al. |
| 2005/0239182 A1 | 10/2005 | Berzin |
| 2005/0240628 A1 | 10/2005 | Jiang et al. |
| 2005/0259103 A1 | 11/2005 | Kilgard et al. |
| 2005/0270298 A1 | 12/2005 | Thieret |
| 2005/0271302 A1 | 12/2005 | Khamene et al. |
| 2006/0010438 A1 | 1/2006 | Brady et al. |
| 2006/0010454 A1 | 1/2006 | Napoli et al. |
| 2006/0028479 A1 | 2/2006 | Chun |
| 2006/0034511 A1 | 2/2006 | Verstraelen |
| 2006/0066609 A1 | 3/2006 | Iodice |
| 2006/0197780 A1 | 9/2006 | Watkins et al. |
| 2006/0214949 A1 | 9/2006 | Zhang |
| 2006/0239540 A1 | 10/2006 | Serra |
| 2006/0282253 A1 | 12/2006 | Buswell et al. |
| 2007/0038939 A1 | 2/2007 | Challen |
| 2007/0046966 A1 | 3/2007 | Mussack |
| 2007/0067497 A1 | 3/2007 | Craft et al. |
| 2007/0092864 A1 | 4/2007 | Reinhardt |
| 2007/0097133 A1 | 5/2007 | Stauffer et al. |
| 2007/0116332 A1 | 5/2007 | Cai et al. |
| 2007/0127802 A1 | 6/2007 | Odry |
| 2007/0156955 A1 | 7/2007 | Royer, Jr. |
| 2007/0165917 A1 | 7/2007 | Cao et al. |
| 2007/0185879 A1 | 8/2007 | Roublev et al. |
| 2007/0188488 A1 | 8/2007 | Choi |
| 2007/0226314 A1 | 9/2007 | Eick et al. |
| 2008/0009055 A1 | 1/2008 | Lewnard |
| 2008/0042923 A1 | 2/2008 | De Laet |
| 2008/0086557 A1 | 4/2008 | Roach |
| 2008/0115139 A1 | 5/2008 | Inglett et al. |
| 2008/0137929 A1 | 6/2008 | Chen et al. |
| 2008/0155890 A1 | 7/2008 | Oyler |
| 2008/0174593 A1 | 7/2008 | Ham |
| 2008/0208961 A1 | 8/2008 | Kim et al. |

(56) References Cited

U.S. PATENT DOCUMENTS

| | | |
|---|---|---|
| 2008/0224700 A1 | 9/2008 | Sorensen |
| 2008/0281908 A1 | 11/2008 | McCanne et al. |
| 2009/0005693 A1 | 1/2009 | Brauner et al. |
| 2009/0043988 A1 | 2/2009 | Archer et al. |
| 2009/0077097 A1 | 3/2009 | Lacapra et al. |
| 2009/0147793 A1 | 6/2009 | Hayakawa et al. |
| 2009/0208082 A1 | 8/2009 | Westerhoff et al. |
| 2009/0210487 A1 | 8/2009 | Westerhoff et al. |
| 2009/0225076 A1 | 9/2009 | Vlietinck |
| 2009/0245610 A1 | 10/2009 | Can et al. |
| 2010/0060652 A1 | 3/2010 | Karlsson |
| 2010/0123733 A1 | 5/2010 | Zaharia |
| 2010/0174823 A1 | 7/2010 | Huang |
| 2010/0272342 A1 | 10/2010 | Berman et al. |
| 2010/0278405 A1 | 11/2010 | Kakadiaris et al. |
| 2011/0044524 A1 | 2/2011 | Wang et al. |
| 2012/0078088 A1 | 3/2012 | Whitestone et al. |
| 2017/0011514 A1 | 1/2017 | Westerhoff |

FOREIGN PATENT DOCUMENTS

| | | |
|---|---|---|
| EP | 0502187 | 9/1992 |
| EP | 0611181 | 8/1994 |
| EP | 0476070 | 8/1996 |
| EP | 0925556 | 6/1999 |
| EP | 0953943 | 11/1999 |
| EP | 0964 366 | 12/1999 |
| EP | 187340 | 3/2001 |
| EP | 2098895 | 9/2009 |
| EP | 2098994 | 9/2009 |
| WO | WO9016072 | 12/1990 |
| WO | WO9102320 | 2/1991 |
| WO | WO9205507 | 4/1992 |
| WO | WO9642022 | 12/1996 |
| WO | WO9810378 | 3/1998 |
| WO | WO9812667 | 3/1998 |
| WO | WO9833057 | 7/1998 |
| WO | WO0120546 | 3/2001 |
| WO | WO0134027 | 5/2001 |
| WO | WO0163561 | 8/2001 |
| WO | WO0174238 | 10/2001 |
| WO | WO0185022 | 11/2001 |
| WO | WO0241760 | 5/2002 |
| WO | WO02067201 | 8/2002 |
| WO | WO02082065 | 10/2002 |
| WO | WO03061454 | 7/2003 |
| WO | WO03088133 | 10/2003 |
| WO | WO03090171 | 10/2003 |
| WO | WO03098539 | 11/2003 |
| WO | WO2004019782 | 3/2004 |
| WO | WO2004020996 | 3/2004 |
| WO | WO2004020997 | 3/2004 |
| WO | WO2004034087 | 4/2004 |
| WO | WO2004044848 | 5/2004 |
| WO | WO2004066215 | 8/2004 |
| WO | WO2004072906 | 8/2004 |
| WO | WO2005071601 | 8/2005 |
| WO | WO2009029636 | 3/2009 |
| WO | WO2009067675 | 5/2009 |
| WO | WO2009067680 | 5/2009 |
| WO | WO2011065929 | 6/2011 |

OTHER PUBLICATIONS

Cabral et al., Accelerated Volume Rendering and Tomographic Reconstruction Using Texture Mapping Hardware•, Silicon Graphics Computer Systems, 1995 IEEE, DD. 91-97.

Carr, Nathan A., Jesse D. Hall, John C. Hart, The ray engine, Proceedings of the ACM SIGGRAPH/Eurographics conference on Graphics hardware, Sep. 1-2, 2002, pp. 37-46.

Chidlow, et al, Rapid Emission Tomography Reconstruction, Proceedings of the 2003 Eurographics/IEEE TVCG Workshop on Volume Graphics, Tokyo, Japan, Jul. 7-8, 2003, 13 pages.

Cohen, Michael, et al., A Progressive Refinement Approach to Fast Radiosity Image Generation, Computer Graphics, vol. 22, No. 4, Aug. 1988, pp. 75-84.

Corner, B., University of Nebraska-Lincoln, MatLab.txt, 2003, 1 page.

Dachille, et al., High-Quality Volume Rendering Using Texture Mapping Hardware, Siggraph/Eurographics Hardware Workshop (1998) (8 pages).

Dempster, et al., Maximum Likelihood From Incomplete Data via the EM Algorithm, Harvard University and Educational Testing Service, Dec. 8, 1976, pp. 1-38.

Dennis, C, et al.,, Overview of X-Ray Computed Tomography, http://www.howstuffworks.com/framed.htm?parent=c...tm &url=http://www.ctlab.geo.utexas.edu/overview/, Dec. 26, 2002, 5 pages.

Dobbins, et al., Digital X-Ray Tomosynthesis: Current State of the Art and Clinical Potential, Physics in Medicine and Biology, vol. 48, pp. R65-R106 (2003).

Doggett, Michael, ATI, Programmability Features of Graphics Hardware, (paper) Apr. 23, 2002, pp. C1-C22.

Doggett, Michael, ATI, Programmability Features of Graphics Hardware, (slideshow) slides 1-62 31 pages.

Du, H., Sanchez-Elez, M., Tabrizi, N., Bagherzadeh, N., Anido, M. L., and Fernandez, M. 2003. Interactive ray tracing on reconfigurable SIMD MorphoSys. In Proceedings of the 2003 Conference on Asia South Pacific Design Automation (Kitakyushu, Japan, Jan. 21-24, 2003). ASPDAC. ACM, New York, NY, 471-476.

Eldridge Matthew, Homan Igehy, Pat Hanrahan, Pomegranate: a fully scalable graphics architecture, Proceedings of the 27th annual conference on Computer graphics and interactive techniques, p. 443-454, Jul. 2000.

Fang, L., et al., Fast Maximum Intensity Projection Algorithm Using Shear Warp Factorization and Reduced Resampling, Mangetic Resonance in Medicine 47:696-700 (2002).

Filtered Backprojection Reconstruction, http://www.physics.ubd.ca/-mirg/home/tutorial/fbDrecon.html, 216/2003, 5 pages.

Goddard et al., High-speed cone-beam reconstruction: an embedded systems approach, 2002, SPIE vol. 4681, pp. 483-491.

Grass et al., Three-dimensional reconstruction of high contrast objects using C-arm image intensifier projection data, 1999, Computerized Medical Imaging and Graphics, 23, pp. 311-321.

Hadwiger, Markus, et al., Hardware-Accelerated High-Quality Reconstruction of Volumetric Data on PC Graphics Hardware, VRVis Research Center, Vienna, Austria, and Institute of Computer Graphics and Algorithms, Vienna University of Technology, Austria, 9 pages.

Hastreiter et al. (Integrated registration and visualization of medical image data, Proc. Computer Graphics International, Jun. 22-26, 1998, pp. 78-85).

Hopf, M., Ertl, T., Accelerating 3d Convolution Using Graphics Hardware, Proc. IEEE Visualization, 1999, 5 pages.

Hudson, et al., Accelerated Image Reconstruction Using Ordered Subsets of Projection Data, IEEE Transactions on Medical Imaging, vol. 13, No. 4, Dec. 1994, pp. 601-609.

Image Registration Slideshow, 105 pages.

Iterative definition, Merriam-Webster on-line dictionary, printed Aug. 26, 2010, 3 pages.

Jain, Anju, A Programmable Graphics Chip, pcquest.com, Jun. 18, 2001.

Jones et al., Positron Emission Tomographic Images and Expectation Maximization: A VLSI Architecture for Multiple Iterations Per Second, Computer Technology and Imaging, Inc., 1988 IEEE, pp. 620-624.

Kajiya, J. T., Ray tracing volume densities, Proc. Siggraph, Jul. 1984, Computer Graphics, vol. 18, No. 3, pp. 165-174.

Karlsson, Filip; Ljungstedt, Carl Johan; Ray tracing fully implemented on programmable graphics hardware, Master's Thesis, Chalmers University of Technology, Dept. of Computer Engineering, Goteborg, Sweden, copyright © 2004, 29 pages.

Kruger J. and R. Westermann, Acceleration Techniques for GPU-based Volume Rendering, Proceedings of IEEE Visualization, 2003, 6 pages.

(56) References Cited

OTHER PUBLICATIONS

Lange et al., EM Reconstruction Algorithms for Emission and Transmission Tomography, J Computer Assisted Tomography 8, DD. 306, et seq. (1984).
Lange et al., Globally Convergent Algorithms for Maximum a Posteriori Transmission Tomography, IEEE Transactions on Image Processing, Vo. 4, No. 10, Oct. 1995, pp. 1430-1438.
Li et al., Tomographic Optical Breast Imaging Guided by Three-Dimensional Mammography, Applied Optics, Sep. 1, 2003, vol. 42, No. 25, pp. 5181-5190.
Li, et al., A Brick Caching Scheme for 30 Medical Imaging, Apr. 15-18, 2004, IEEE International Symposium on Biomedical Imaging: Macro to Nano 2004, vol. 1, pp. 563-566.
Maes, et al. Multimodality Image Registration by Maximization of Mutual Information, IEEE Tran. on Medical Imaging, vol. 16, No. 2, Apr. 1997. pp. 187-198).
Max, N., Optical Models for Direct Volume Rendering, IEEE Transactions on Visualization and Computer Graphics, Jun. 1995, 1(2): pp. 99-108.
McCool, M. et al., Shader Algebra, 2004, pp. 787-795.
McCool, Michael J., Smash: A Next-Generation API for Programmable Graphics Accelerators, Technical Report CS-200-14, Computer Graphics Lab Dept. of Computer Science, University of Waterloo, Aug. 1, 2000.
Microsoft, Architectural Overview Direct for 3D, http://msdn.microsoft.com/library/default.asp?url=/library/en-us/dx8_c/directx_cpp/Graphics/ProgrammersGuide/GettingStarted/ Architecture, 12120/2002, 22 pages.
Mitchell, Jason L., RadeonTM 9700 Shading, SIGGRAPH 2002—State of the Art in Hardware Shading Course Notes, DD.3.1-1-3. 1-39, 39 pages.
Mitschke et al., Recovering the X-ray projection geometry for three-dimensional tomographic reconstruction with additional sensors: Attached camera versus external navigation system, 2003, Medical Image Analysis, vol. 7, pp. 65-78.
Mueller, K., and R. Yagel, Rapid 3-D Cone Beam Reconstruction With the Simultaneous Algebraic Reconstruction Technique (Sart) Using 2-D Texture Mapping Hardware, IEEE Transactions on Medical Imaging, Dec. 2000, 19(12): pp. 1227-1237.
Navab, N., et al., 3D Reconstruction from Projection Matrices in a C-Arm Based 3D-Angiography System, W.M. Wells e al., eds., MICCAI'98, LNCS 1496, pp. 119-129, 1998.
Parker, S., et al., Interactive Ray Tracing for Isosurface rendering, IEEE, 1998, pp. 233-258.
PCT/US2008/084282, Preliminary and International Search Reports, dated May 11, 2011.
PCT/US2005/000837, Preliminary and International Search Reports, dated May 11, 2005.
PCT/US2008/74397, Preliminary and International Search Reports, dated Dec. 3, 2008.
PCT/US2008/84368, Preliminary and International Search Reports, dated Jan. 13, 2009.
PCT/EP2016/067886, Preliminary and International Search Reports, dated Jan. 17, 2017.
PCT/US2008/84376, Preliminary and International Search Reports, dated Jan. 12, 2009.
Pfister, H., et. al., The VolumePro real-time ray-casting System, Computer Graphics Proceedings of SIGGRAPH), Aug. 1999, No. 251-260.
Phong, B. T. Illumination for Computer Generated Pictures, Communications of the ACM, 18(6), Jun. 1975, pp. 311-317.
Porter, D. H. 2002. Volume Visualization of High Resolution Data using PC-Clusters. Tech. rep., University of Minnesota. Available at http://www.lcse.umn.edu/hvr/pc_vol_rend_L.pdf.
Potmesil, M. and Hoffert, E. M. 1989. The pixel machine: a parallel image computer. In Proceedings of the 16th Annual Conference on Computer Graphics and interactive Techniques SIGGRAPH '89. ACM, New York, NY, 69-78.
Purcell, T., et al., Real-time Ray Tracing on Programmable Graphics Hardware, Department of Computer Science, Stanford University, Stanford, CA, Submitted for review to SIGGRAPH 2002, 2002. http://graphics.stanford.edu/papers/rtongfx/rtongfx_submit.pdf.
Purcell, T., et. al., Ray tracings on Programmable Graphics Hardware, Computer Graphics (ProceedinQs of SIGGRAPH), 1998, pp. 703-712.
Purcell, Timothy J., Craig Donner, Mike Cammarano , Henrik Wann Jensen , Pat Hanrahan, Photon mapping on programmable graphics hardware, Proceedings of the ACM SIGGRAPH/Eurographics conference on Graphics hardware, Jul. 26-27, 2003, 11 pages.
Ramirez et al. (Prototypes stability analysis in the design of a binning strategy for mutual information based medical image registration, IEEE Annual Meeting of the Fuzzy Information, Jun. 27-30, 2004, vol. 2, pp. 862-866.
Rib Cage Projection, downloaded from http://www.colorado.edu/physics/2000/tomography/final_rib_cage.html on Dec. 26, 2002, 3 pages.
Roettger, Stefan, et al., Smart Hardware-Accelerated Volume Rendering, Joint Eurographics—IEEE TCVG Symposium on Visualization, 2003, pp. 231-238, 301.
Sandborg, Michael, Computed Tomography: Physical principles and biohazards, Department of Radiation Physics, Faculty of Health Sciences, Linkoping University, Sweden, Report 81 ISSN 1102-1799, Sep. 1995 ISRN ULI-RAD-R—81—SE, 18 pages.
Sarrut et al. (Fast 30 Image Transformations for Registration Procedures, Proc. Int'I Conf. on Image Analysis and Processing, Sep. 27-29, 1999, pp. 446-451.
Selldin, Hakan, Design and Implementation of an Application Programming Interface for Volume Rendering, Linkooings Universitet.
Shekhar, R.; Zagrodsky, V., Cine MPR: interactive multiplanar reformatting of four-dimensional cardiac data using hardware-accelerated texture mapping, IEEE Transactions on Information Technology in Biomedicine, vol. 7, No. 4, pp. 384-393, Dec. 2003.
Silver, et al., Determination and correction of the wobble of a C-arm gantry, Medical Imaging 2000: Image Processing, Kenneth M. Hanson, ed., Proceedings of SPIE vol. 3970 (2000).
Stevens, Grant, et al., Alignment of a Volumetric Tomography System, Med. Phys., 28 (7), Jul. 2001.
Tasdizen, T. , Ross Whitaker, Paul Burchard , Stanley Osher, Geometric surface processing via normal maps, ACM Transactions on Graphics (TOG), v.22 n.4, p. 1012-1033, Oct. 2003.
Tasdizen, T.; Whitaker, R.; Burchard, P.; Osher, S.; Geometric surface smoothing via anisotropic diffusion of normals, IEEE Visualization, VIS 2002, Nov. 2002, pp. 125-132.
Technical Brief: NVIDIA nfiniteFX Engine: Programmable Pixel Shaders, NVIDIA Corporation, 5 pages.
Technical Brief: NVIDIA nfiniteFX Engine: Programmable Vertex Shaders, NVIDIA Corporation, 12 pages.
Viola, I, et al., Hardware Based Nonlinear Filtering and Segmentation Using High Level Shading Languages, Technical Report TR-186-2-03-07, May 2003, 8 pages.
Viola, P., Alignment by Maximization of Mutual Information, PhD Thesis MIT (Also Referred to as—AI Technical report No. 1548), MIT Artificial Intelligence Lab, Jun. 1, 1995, pp. 1-29.
Weiler, M, M. Kraus and T. Ertl, Hardware-Based View-Independent Cell Projection, Proceedings IEEE Symposium on Volume Visualization 2002, pp. 13-22.
Weiler, M. et al., Hardware-based ray casting for tetrahedral meshes, IEEE Visualization, VIS 2003, Oct. 24-24, 2003, pp. 333-340.
Weiler, M. et al., Hardware-Based view-Independent Cell Projection, IEEE, 2002, pp. 13-22.
Weiskopf, D., T. Schafhitzel, T. Ertl, GPU-Based Nonlinear Ray Tracing, Eurographics, vol. 23, No. 3, Aug. 2004.
Wen, Junhai; Zigang Wang; Bin Li; Zhengrong Liang; An investigation on the property and fast implementation of a ray-driven method for inversion of the attenuated Radon transform with variable focusing fan-beam collimators, 2003 IEEE Nuclear Science Symposium Conference Record, vol. 3, Oct. 19-25, 2003, pp. 2138-2142.
Wu et al., Tomographic Mammography Using a Limited Number of Low-dose Conebeam Projection Images, Med. Phys., pp. 365-380 (2003).

(56) References Cited

OTHER PUBLICATIONS

Xu et al., Toward a Unified Framework for Rapid 30 Computed Tomography on Commodity GPUs, Oct. 19-25, 2003, IEEE Nuclear Science Symposium Conference 2003, vol. 4, pp. 2757-2759.
Xu et al., Ultra-fast 30 Filtered Backprojection on Commodity Graphics Hardware, Apr. 1-18, 2004, IEEE International symposium on Biomedical Imaging: Macro to Nano, vol. 1, pp. 571-574 and corresponding power point presentation.

* cited by examiner

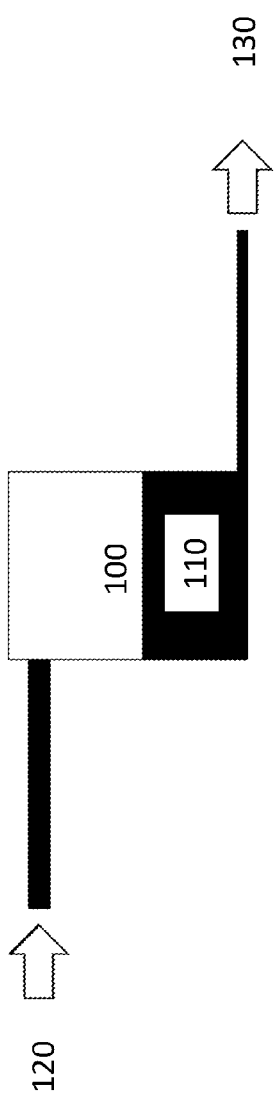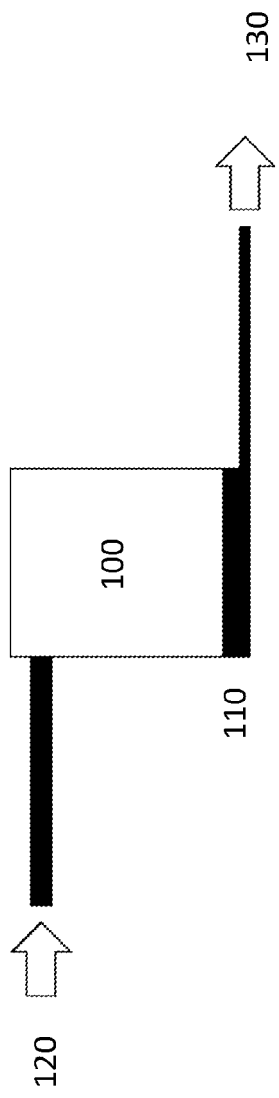

METHOD AND SYSTEM FOR TRANSFERRING DATA TO IMPROVE RESPONSIVENESS WHEN SENDING LARGE DATA SETS

PRIORITY CLAIM

This application is a continuation of U.S. application Ser. No. 13/831,982 filed Mar. 15, 2013 the teachings of which are incorporated herein by reference in its entirety.

FIELD OF INVENTION

The invention pertains to digital data processing and, more particularly, by way of example, to the transferring of data between a client and a server and has application to areas including medical imaging, atmospheric studies, astrophysics, microscopy, spectroscopy, satellite imaging and geophysics.

BACKGROUND

Many computer applications today demand high network bandwidth over the internet. Good examples are systems that download large amount of data such as files, music or videos. Most of the internet traffic today is carried out via the Transmission Control Protocol (TCP). The main advantage of TCP is that it provides reliable data transfer to the application layer. The application does not have to deal with lost data packets, corrupted data packets, or out-of-order arrival of packets. All types of error detection and retransmission algorithms are already implemented in the TCP protocol. Also, sophisticated methods for congestion avoidance and flow control have been added to the TCP protocol. Most of these methods are intended to optimize bandwidth, i.e., data throughput, over a network.

Maximized data throughput usually comes at the price of increased latency. For example, a common technique is to not send out small pieces of data immediately but to wait until more data is available, so that larger packets can be sent then (e.g. Nagle algorithm). This increases bandwidth but also introduces extra delay. Another approach is to send out large amounts of data before getting an acknowledgement by the receiver. This also increases bandwidth but at the same time may increase the time a data packet is in transfer.

For many applications maximum bandwidth is by far the most important criterion. Increased latency is often not a problem. This is not true for applications like voice over Internet Protocol (IP) or teleconferencing. Here low response times, i.e. low latency, are crucial. These applications usually disable the Nagle algorithm or do not use TCP at all. Often bandwidth requirements are not that high for such applications.

Another class of applications requires both high bandwidth and low latency. This is true for example for a client-server based medical image viewer. Such a system needs to display large amounts of image data which are streamed from the server to the client. Often it is advisable to send images before they are requested by the client such as in traditional streaming applications. For example, if a doctor looks at the first image of a 3D image series then it is likely that she will also look at the second image soon. But if the doctor proceeds, some images that are scheduled for later streaming suddenly have to be transferred immediately, or images have to be rendered on the server and then displayed on the client as soon as possible. Thus it is important that the server stays always responsive and that new data can be sent as quickly as possible to the client based on current user interaction.

A general aspect of network based applications is that often not all parameters of the network are known, or can be influenced by the application. For example routers or other network devices between the endpoints may introduce latencies and buffers that are not application controlled. Often the network has to be regarded a black box.

SUMMARY OF THE INVENTION

In an embodiment of the present invention, a client-server based medical image viewing system that sends data over a standard TCP connection in such a way that high data throughput is achieved without impacting responsiveness. Special timestamp messages inserted into the data stream allow the system to detect situations where network latency increases noticeably and to obtain a reliable estimate of sustained transfer bandwidth. In an embodiment of the present invention, the system applies a feedback scheme that avoids network delays by limiting send bandwidth. In various embodiments of the present invention, other parameters, in particular image compression settings, can be dynamically adjusted depending on current network latency.

BRIEF DESCRIPTION OF THE DRAWINGS

FIG. 1 is a diagram showing a simple network model with filled buffer;

FIG. 2 is a diagram showing a simple network model with empty buffer; and

DESCRIPTION OF THE INVENTION

Definitions

Figure 3:
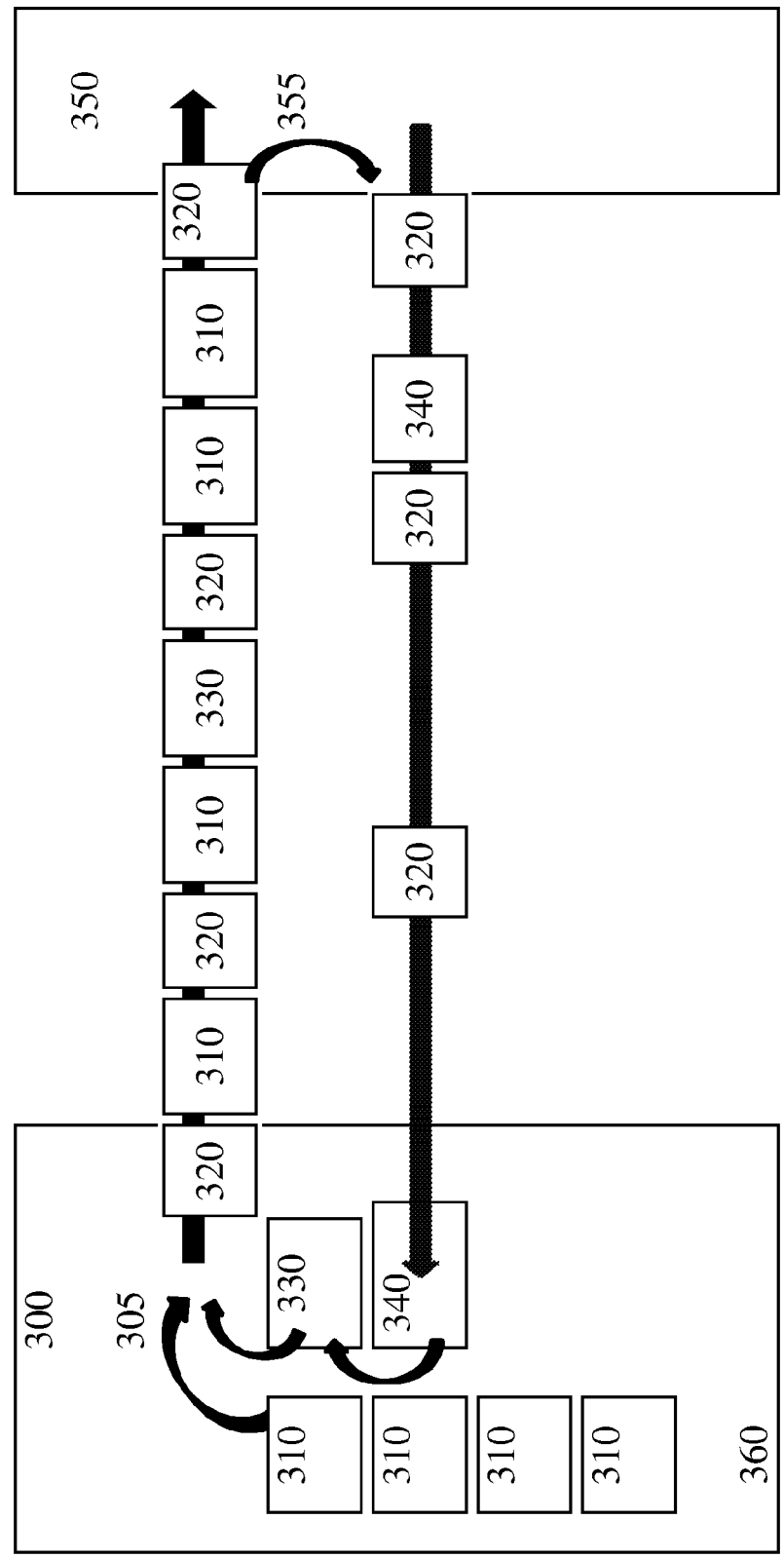
FIG. 3 is flowchart showing an overview of transferring timestamp messages and other data between the client and server.

The transitional term "comprising" is synonymous with "including," "containing," or "characterized by," is inclusive or open-ended and does not exclude additional, unrecited elements or method steps.

The transitional phrase "consisting of" excludes any element, step, or ingredient not specified in the claim, but does not exclude additional components or steps that are unrelated to the invention such as impurities ordinarily associated with a composition.

The transitional phrase "consisting essentially of" limits the scope of a claim to the specified materials or steps and those that do not materially affect the basic and novel characteristic(s) of the claimed invention.

The term "bandwidth" and "send bandwidth" refer to various bit-rate measures, representing the available or consumed data communication resources expressed in bits per second or multiples of it.

The term "adaptive bandwidth management" means methods that continuously adjust the amount of data that is sent into a network per time in order to avoid or reduce network congestion and transfer delay . . . .

The term "buffer" or "network buffer" refers to a temporary storage area acting as a holding area, enabling the computer or network to manipulate data before transferring it to a device.

The term "client-server" refers to a computer system that selectively shares its resources; a client is a computer or computer program that initiates contact with a server in order to make use of a resource. This sharing of computer resources allows multiple people to use a computer server at the same time. Because a computer does a limited amount of work at any moment, a time-sharing system must quickly prioritize its tasks to accommodate the clients. Clients and servers exchange messages in a request-response messaging pattern: The client sends a request, and the server returns a response.

The term "application layer" or "application-level protocol" refers to the communications between computers. To communicate, the computers must have a common language, and they must follow rules so that both the client and the server know what to expect. The language and rules of communication are defined in a communications protocol. All client-server protocols operate in the application layer.

The term "lossy compression" refers to a data encoding method that compresses data by discarding or losing some of it. The procedure aims to minimize the amount of data that needs to be held, handled, and/or transmitted by a computer.

The term "network latency" can be measured either 'one-way' as the time taken for the source to send a packet to a destination or 'round-trip' from the one-way latency from source to destination plus the one-way latency from the destination back to the source.

The term "pseudo code" is an informal high-level description of the operating principle of a computer program or other algorithm.

The term "timestamp message" refers to a message that contains an indication of a point in time on either the server or the client, or the difference between two such points in time. Timestamp messages may be exchanged between client and server in both directions.

The term "Transmission Control Protocol" or TCP includes using a "congestion window" to determine how many packets can be sent at one time. The larger the congestion window size, the higher the throughput. The TCP "slow start" and "congestion avoidance" algorithms determine the size of the congestion window. The maximum congestion window is related to the amount of buffer space that the kernel allocates for each socket.

In the following description, various aspects of the present invention will be described. However, it will be apparent to those skilled in the art that the present invention may be practiced with only some or all aspects of the present invention. For purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As is well understood by those skilled in the art, these quantities (data, selection, retrieval, generation) take the form of electrical, magnetic, or optical signals capable of being stored, transferred, combined, and otherwise manipulated through electrical, optical, and/or biological components of a processor and its subsystems.

Various operations will be described as multiple discrete steps in turn, in a manner that is most helpful in understanding the present invention; however, the order of description should not be construed as to imply that these operations are necessarily order dependent.

Various embodiments will be illustrated in terms of exemplary classes and/or objects in an object-oriented programming paradigm. It will be apparent to one skilled in the art that the present invention can be practiced using any number of different classes/objects, not merely those included here for illustrative purposes. Furthermore, it will also be apparent that the present invention is not limited to any particular software programming language or programming paradigm.

The invention is illustrated by way of example and not by way of limitation in the figures of the accompanying drawings in which like references indicate similar elements. It should be noted that references to 'an' or 'one' embodiment in this disclosure are not necessarily to the same embodiment, and such references mean at least one.

A render server program is described in U.S. application Ser. No. 13/831,967, entitled "Multi-User Mult-GPU Render Server Apparatus and Methods", inventors M. Westerhoff etr al, which was filed Mar. 15, 2013, is herein expressly incorporated by reference in its entirety. A rule based render server program is described in U.S. application Ser. No. 13/831,975, entitled "Method and System for Rule-Based Display of Sets of Images", inventors M. Westerhoff etr al, which was filed Mar. 15, 2013, is herein expressly incorporated by reference in its entirety.

In one embodiment of the present invention, a client-server based medical image viewing system uses the TCP protocol for data transfer, but at the same time avoids network congestion and thus achieves both high data throughput and low latency. The system is non-intrusive in that it does not change the TCP implementation and does not make use of special network drivers. Instead, the transport layer is considered as a black box and only the actual performance of the network is monitored. Based on the monitoring results different actions are taken by the application itself in order to cope with the current network quality.

Water Pipe Model

The following analogy helps to illustrate an embodiment of the present invention. Assume that a network behaves like a system of water pipes of different cross-sections. Somewhere inside the system there are "water barrels" or network buffers that can fill up as shown in FIG. 1. Initially a large amount of "water" or data can be pumped into the network. "Inflow" or send bandwidth is high 120, but "outflow" or "read bandwidth" on the client side might be much smaller 130. In effect the "water barrels" or network buffers 100 fill up 110. It then takes a long time until a new "drop of water" or data packet can pass into the network. Latency has increased and the server is not able to respond quickly to user input. The result is that the "pipes" or connections are congested.

In order to keep the server responsive it is important to prevent the network buffers 100 from filling up 110 as depicted in FIG. 2. In an embodiment of the invention, the server can only send as much data into the network 120 as the thinnest pipe or weakest connection can convey 130. Note, that the overall throughput or bandwidth is not decreased if send bandwidth is limited.

Detecting Latency Increase

In an embodiment of the present invention, the system uses its own message-based protocol that is transported over a TCP connection. In this embodiment, all benefits of TCP are retained for ease of use and reliability. Small timestamp messages are sent from the server to the client and back from the client to the server. FIG. 3 is a flowchart depicting an overview of the message-based protocol and timestamp messages. These timestamp messages allow an estimate of the current network bandwidth to determine when network latency will increase due to congestion or decrease due to de-congestion. In FIG. 3 the server is on the left 300 and the client is on the right 350. The server has a transfer queue 360 that holds multiple data packets 310 queued for transfer. In addition, the client may request 340 extra packets 330 from the server. Data packets requested by the client have precedence 305 over packets originating from the transfer queue. Inserted into the data stream are timestamp messages 320 which are first sent from the server to the client and then returned by the client 355.

A timestamp message that the server sends to the client only contains the time 't' in milliseconds since the server was started. In addition, the server stores the timestamp message in a First In, First Out (FIFO) queue. Together with the message the server also stores the total number of bytes 'c' that were sent to the client up to that point in time, as well as the current send bandwidth $b_{send}$ in bytes/sec.

In an embodiment of the present invention, every timestamp message that arrives at the client is immediately sent back to the server. In an embodiment of the present invention, the order of messages is preserved. In an embodiment of the present invention, messages that are sent back to the server contain the difference 'd' between the client time (measured in milliseconds since client was started) and the server time 't' that was contained in the incoming timestamp message. In an embodiment of the present invention, it is not required that clocks on server and client are synchronized, i.e., that both clocks were started at the same time.

In an embodiment of the present invention, the smallest value $d_{min}$ that occurs in any of the timestamp messages that arrive back at the server defines a baseline for detecting increased latency. Without synchronized clocks it is difficult if not impossible to determine how long it really takes for a message to pass from the server to the client. However, it is possible to determine how much more travel time was needed for an arbitrary message compared to the fastest message. This increase of travel time or delay is given by $e=d-d_{min}$. If 'e' increases significantly it is apparent that network buffers are filling up and that send bandwidth must be reduced.

Estimating Bandwidth

In an embodiment of the present invention, a key requirement for the system to be able to choose a reasonable send bandwidth and to adjust other application settings to network quality is a reliable estimate of sustained transfer bandwidth. An estimate is computed as follows:

If a timestamp message arrives back at the server, it is taken out of the FIFO queue. The time that was spent on the client between receiving the last two timestamp messages is given by:

$$T=t_i-t_{i-1}+d_i-d_{i-1}$$

The amount of data C that was read in that time is given by the number of bytes that were sent between the last two timestamp messages:

$$C=c_i-c_{i-1}$$

From these quantities the read bandwidth at the client is determined as:

$$b_{read}=C/T.$$

In an embodiment of the present invention, if send bandwidth $b_{send}$ is significantly larger than read bandwidth $b_{read}$ (e.g. by more than 30%) we assume that the network is saturated and that $b_{read}$ is a good estimate of transfer bandwidth. In an embodiment of the present invention, a running average is computed of multiple (e.g. 10) such $b_{read}$ samples in order to obtain a best estimate $b_{est}$ of transfer bandwidth. In an unexpected result, in order to quickly get reliable results, especially shortly after the client was started and the network is not yet saturated, it turned out to be beneficial to also include $b_{read}$ samples into the running average if they are significantly larger than the current best estimate (e.g. by more than 40%). Further, in an embodiment of the present invention, outliers can be discarded by clamping $b_{read}$ so that it does not exceed twice the current best estimate $b_{est}$.

Limiting Send Bandwidth

In an embodiment of the present invention, a good estimate $b_{est}$ of sustained transfer bandwidth allows the transfer to be slowed in case latency increases noticeably. In an embodiment of the present invention, send bandwidth is limited if the delay 'e' exceeds a certain threshold $e_{max}$. In an embodiment of the present invention, send bandwidth is limited when e is greater than approximately 40 msec. In an alternative embodiment of the present invention, send bandwidth is limited when e is greater than approximately 50 msec. When calculating 'e' approximately refers to plus or minus twenty percent. In an embodiment of the present invention, a bandwidth limit $b_{limit}$ of approximately sixty (60) percent of $b_{est}$ is enforced when 'e' exceeds $e_{max}$. In an alternative embodiment of the present invention, a bandwidth limit $b_{limit}$ of approximately seventy (70) percent of $b_{est}$ is enforced when 'e' exceeds $e_{max}$. When calculating 'b' approximately refers to plus or minus twenty percent. In an embodiment of the present invention, if delay 'e' later drops below $e_{max}$, the bandwidth limit is gradually lifted again by incrementing the current limit by a value that is increased if extra latency is reduced.

In various embodiments of the present invention, extra safeguards can be incorporated into the scheme in order to make it more robust against measurement errors and noise. In an embodiment of the present invention, bandwidth is not reduced if there are less than 10 KB of data in the line. In an embodiment of the present invention, the number of bytes in the line can be estimated by $c-c_i$, where $c_i$ is the current total number of bytes that were sent to the client up to that point in time and $c_i$ is the total number of bytes that were sent to the client at the time the current timestamp message was sent. In an embodiment of the present invention, if a bandwidth limit is already active it is never reduced by more than 50%.

The resulting feedback scheme leads to a transmission rate on the server side that constantly oscillates around the estimated sustained transfer bandwidth $b_{est}$. Usually oscillation frequency is higher if the total latency between server and client is lower. This is because timestamp messages return earlier at the server, and thus the server can adjust transmission rate more quickly. On higher latency connections oscillation frequency is lower, and amplitude of latency oscillation is greater. In various embodiments of the present invention, the overall behavior of the feedback scheme can be tuned by varying the different parameters. In practice, the values stated above turned out to work very well for different kinds of networks ranging from metropolitan area networks, domestic connections, and intercontinental lines.

Feedback scheme pseudo code:

```
if (e > e_max)
then
```

-continued

```
        if (number of bytes in line > threshold)
        then
                b_limit := max(Factor_1 * b_est, Factor_2 * b_limit)
        end
    else
    if (b_read > Factor_3 * b_limit)
    then
            d := Factor_4 * b_limit * (e_max - e)/e_max
            b_limit := b_limit + d
    end
```

Adjusting Compression Settings and Buffering

In an embodiment of the present invention, the server always stays responsive by limiting send bandwidth. In an embodiment of the present invention, if a large number of data files (e.g., images) are queued for transfer on the server, when the client requests a large data file (e.g., a new image) or some other information be delivered instantly, then this new data can be sent without significant extra delay as seen in FIG. 3.

In an embodiment of the present invention, a good estimate of transfer bandwidth also allows the application to dynamically adjust other settings to current network quality, like image compression settings. If network bandwidth is poor, the application can react to that occurrence. For a single-stream application, such as streaming a single video or audio channel, the compression ratio can simply be adjusted such that the resulting bandwidth is slightly under the available bandwidth, which combined with buffering yields the desired result.

In another embodiment of the present invention, in an interactive visualization application, adjustable lossy compression can be applied in a similar manner in order to achieve smooth interaction. Image quality might be degraded, but images can still be displayed very quickly. Higher quality versions of the images can be resent later and the view can be refined. It is not obvious though, how buffering can be applied, because the interaction is not known ahead of time.

An example for such an application is a client server system to display medical image studies. Medical image studies can consist of multiple images that can be organized in multiple series. It is desirable to be able to view these images in a multi-viewport layout on the client computer. As the user looks at a series of images, the user will interact with the images, e.g., scrolling, rotating panning or zooming. It is not known in advance, in which direction a user will scroll, or if multiple image series exist, which of these the user will look at first. The same is true for any other interaction with the scene, such as rotation of a 3D volume rendering.

Another embodiment of the present invention monitors the current user interaction and allows the application to anticipate the next views to be streamed. These views are then streamed to the client and buffered, so that they can be displayed without delay.

For example if a user looks at and interacts with a viewport displaying one image series ("Current Series"), images from that series will more likely be displayed next than images from other series. Thus these images will be streamed to a buffer on the client side first. The order is determined by the distance of images to the currently displayed image in the sorting order of the series: The closest image will be streamed first. The same concept applies to other types of displays and other types of interaction. For example if a 3D volume rendered view of a data set is shown and the user currently rotates the model about e.g. the X-axis, then from the current view, the next views can be anticipated and pre-streamed and buffered locally.

TABLE 1

Symbols and Meaning

| Symbol | Description |
| --- | --- |
| T | Server time in msec |
| C | Total number of bytes that were sent from server to client |
| $b_{send}$ | Send bandwidth at server |
| $b_{read}$ | Read bandwidth at client |
| $b_{est}$ | Estimate of sustained transfer bandwidth |
| $b_{limit}$ | Bandwidth limit on server side (send) |
| d | Difference between client and server time when timestamp arrives at client |
| e | Extra travel time for messages sent from server to client (delay) |

While the present invention has been described in some detail for purposes of clarity and understanding, one skilled in the art will appreciate that various changes in form and detail can be made without departing from the true scope of the invention. All figures, tables, and appendices, as well as patents, applications, and publications, referred to above, are hereby incorporated by reference.

Aspects of the Invention

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where the estimate of current network bandwidth is calculated from a difference between the first time and the second time or the second time and the subsequent times.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where the estimate of current network bandwidth is compared with a minimum network bandwidth.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where the estimate of current network bandwidth is compared with a minimum network bandwidth, further comprising refining the estimate of current network bandwidth based on a comparison.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where information related to one or more of the first timestamp message and the one or more second timestamp messages is not included in the first timestamp message, where the information is stored in a first in first out queue, so that the information can be evaluated when the first timestamp message arrives back at the server.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where one or more of the first timestamp message and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$, where $d_i$ and $d_{i-1}$ are client time and $t_i-t_{i-1}$ are server time in a last two incoming timestamp messages.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where one or more of the first timestamp message and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$, where $d_i$ and $d_{i-1}$ are client time and $t_i-t_{i-1}$ are server time in a last two incoming timestamp messages, further comprising determining a running average, where samples of read bandwidth are combined into the running average.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where one or more of the first timestamp message and the one or more second timestamp messages are used to compute read bandwidth (C/T), where $C=c_i-c_{i-1}$, where C is an amount of data C that was read in a time between a last two timestamp messages $(c_i, c_{i-1})$, and $T=t_i-t_{i-1}+d_i-d_{i-1}$, where $d_i$ and $d_{i-1}$ are client time and $t_i-t_{i-1}$ are server time in a last two incoming timestamp messages, further comprising determining a running average, where samples of read bandwidth are combined into the running average, where samples are excluded from the running average when send bandwidth is less than between a lower limit of approximately 20 percent of read bandwidth and an upper limit of approximately 40 percent of read bandwidth.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where the estimate of current network bandwidth is calculated from a difference between the first time and the second time or the second time and the subsequent times.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where the estimate of current network bandwidth is compared with a minimum network bandwidth.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where the estimate of current network bandwidth is compared with a minimum network bandwidth, further comprising refining the estimate of current network bandwidth based on a comparison between times.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where samples are excluded from the running average when send bandwidth is less than between a lower limit of approximately 130 percent of the read bandwidth measured at a time a timestamp message arrived at the client computer and an upper limit of approximately 140 percent of the estimate of current network bandwidth.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the feedback scheme uses a pseudo code.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the feedback scheme uses a pseudo code, where the pseudo code includes an expression

```
if (e > emax)
then
    if (number of bytes in line > threshold)
    then
        blimit := max(Factor1 * best, Factor2 * blimit)
    end
```

```
else
if (bread > Factor3 * blimit)
then
    d := Factor4 * blimit * (emax − e)/emax
    blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where the pseudo code includes an expression

```
if (e > emax)
then
```

-continued

```
        if (number of bytes in line > threshold)
        then
            blimit := max(Factor1 * best, Factor2 * blimit)
        end
    else
    if (bread > Factor3 * blimit)
    then
        d := Factor4 * blimit * (emax − e)/emax
        blimit := blimit + d
    end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the pseudo code includes an expression

```
    if (e > emax)
    then
        if (number of bytes in line > threshold)
        then
            blimit := max(Factor1 * best, Factor2 * blimit)
        end
    else
    if (bread > Factor3 * blimit)
    then
        d := Factor4 * blimit * (emax − e)/emax
        blimit := blimit + d
    end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the buffering system is based on monitoring user interaction and anticipating a next image that will be requested by the client computer, where the pseudo code includes an expression

```
if (e > emax)
then
    if (number of bytes in line > threshold)
    then
        blimit := max(Factor1 * best, Factor2 * blimit)
    end
else
if (bread > Factor3 * blimit)
then
    d := Factor4 * blimit * (emax - e)/emax
    blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the buffering system is based on monitoring user interaction and anticipating a next image that will be requested by the client computer, where the bandwidth limit is used to compute the lossy compression rate, where the lossy compression rate is used to calculate a compression ratio, where one or more compressed images are streamed with the compression ratio, where a target compression quality is defined by a user, where a first image is streamed with a first compression quality, where the first compression quality minimizes network latency during interaction based on bandwidth monitoring and where the first image is streamed with a second compression quality when the user stops interacting, where the second compression quality is greater than the first compression quality if the first compression quality is lower than a target compression quality, where the pseudo code includes an expression

```
if (e > emax)
then
    if (number of bytes in line > threshold)
    then
        blimit := max(Factor1 * best, Factor2 * blimit)
    end
else
if (bread > Factor3 * blimit)
then
    d := Factor4 * blimit * (emax - e)/emax
    blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the buffering system is based on monitoring user interaction and anticipating a next image that will be requested by the client computer, where the bandwidth limit is used to compute the lossy compression rate, where the lossy compression rate is used to calculate a compression ratio, where one or more compressed images are streamed with the compression ratio, where the pseudo code includes an expression

```
if (e > emax)
then
    if (number of bytes in line > threshold)
    then
        blimit := max(Factor1 * best, Factor2 * blimit)
    end
else
if (bread > Factor3 * blimit)
then
    d := Factor4 * blimit * (emax - e)/emax
    blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the buffering system is based on monitoring user interaction and anticipating a next image that will be requested by the client computer, where the bandwidth limit is used to compute the lossy compression rate, where the pseudo code includes an expression

```
if (e > emax)
then
    if (number of bytes in line > threshold)
    then
        blimit := max(Factor1 * best, Factor2 * blimit)
    end
else
if (bread > Factor3 * blimit)
then
    d := Factor4 * blimit * (emax - e)/emax
    blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the pseudo code includes an expression

```
if (e > emax)
then
    if (number of bytes in line > threshold)
    then
        blimit := max(Factor1 * best, Factor2 * blimit)
    end
else
if (bread > Factor3 * blimit)
then
    d := Factor4 * blimit * (emax − e)/emax
    blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the feedback scheme uses a pseudo code, where the pseudo code includes an expression

```
if (e > emax)
then
    if (number of bytes in line > threshold)
    then
        blimit := max(Factor1 * best, Factor2 * blimit)
    end
else
if (bread > Factor3 * blimit)
then
    d := Factor4 * blimit * (emax − e)/emax
    blimit := blimit + d
end.
```

What is claimed:

1. A method comprising:
   (a) determining a congestion window including:
      inserting a first timestamp message into an application level request associated with a first image from a client computer;
      transferring the application level request and the first timestamp message to a server;
      receiving the first timestamp message at the server, where a first time is calculated based on the time the first timestamp message is received and the first timestamp message, and calculating the send bandwidth at the server ($b_{send}$) in bytes/msec, where the first client time is used to compute $b_{send}$;
      sending one or more second timestamp messages from the server to the client computer;
      receiving the second timestamp message at the client computer, where a second time ($t_i$) is calculated based on the time the second timestamp message is received and the second timestamp message;
      calculating an estimate of sustained bandwidth ($b_{est}$) in bytes/msec based on the first time and the second time; and
      determining a congestion window based on one or both $b_{send}$ and $b_{est}$; and
   (b) sending a second image before the second image is requested based on a determination of a congestion window less than a maximum congestion window.

2. The method of claim 1, further comprising determining a running average of $b_{est}$ based on a comparison between two or more first times and two or more second times, where $b_{est}$ is an estimate of sustained transfer bandwidth.

3. A method comprising:
(a) determining a congestion window including:
  inserting a first timestamp message into an application level request associated with a first image from a client computer;
  transferring the application level request and the first timestamp message to a server;
  receiving the first timestamp message at the server, where a first time is calculated based on the time the first timestamp message is received and the first timestamp message;
  sending one or more second timestamp messages from the server to the client computer;
  receiving the second timestamp message at the client computer, where a second time ($t_i$) is calculated based on the time the second timestamp message is received and the second timestamp message, and calculating the read bandwidth ($b_{read}$) in bytes/msec, where $b_{read}$=C/T, where C (the total number of bytes that were sent from server to clients)=$c_i$−$c_{i-1}$, is an amount of data that was sent in a time between a last two second timestamp messages ($c_i$, $c_{i-1}$), and T=$t_i$−$t_{i-1}$+$d_i$−$d_{i-1}$, where T (the server time in msec) is equal to the time elapsed on the server between the last two second timestamp messages ($t_i$, $t_{i-1}$), $t_i$−$t_{i-1}$, and $d_i$ and where $d_{i-1}$ are differences between client computer time and server time when one or more second time stamp messages arrived at the server;
  calculating an estimate of sustained bandwidth ($b_{est}$) in bytes/msec based on the first time and the second time; and
  determining a congestion window based on one or both $b_{read}$ and $b_{est}$; and
(b) sending a second image before the second image is requested based on a determination of a congestion window less than a maximum congestion window.

4. The method of claim 3, where $b_{read}$ is used as $b_{est}$ when $b_{send}$ is greater than thirty (30) percent of $b_{read}$.

5. The method of claim 3, where $b_{read}$ samples are included into the running average when $b_{read}$ is more than approximately forty (40) percent of $b_{est}$.

6. The method of claim 2, where a bandwidth limit ($b_{limit}$) is applied on the server, where $b_{limit}$ is computed using a feedback scheme, where $b_{limit}$ is the bandwidth limit on server side.

7. The method of claim 6, where the feedback scheme uses a pseudo code.

8. The method of claim 7, where the pseudo code includes an expression

```
if (e > e_max)
then
    if (number of bytes in line > threshold)
    then
        b_limit := max(Factor1 * b_est, Factor2 * b_limit)
    end
else
if (b_read > Factor3 * b_limit)
then
    d := Factor4 * b_limit * (e_max − e)/e_max
    b_limit := b_limit + d
end
``` where e is the extra travel time for messages sent from the server to the client, $e_{max}$ is the threshold delay, d is the difference between the client and the server time when the timestamp arrives at the client, Factor1, Factor2, Factor3 and Factor4 are factors which enforce conditions specified by the pseudo code.

9. The method of claim 8, where $b_{limit}$ is used to compute a lossy compression rate.

10. The method of claim 9, where the lossy compression rate is calculated in order to achieve a desired interactive speed.

11. The method of claim 10, where the lossy compression rate is used to stream compressed images with a compression ratio.

12. The method of claim 8, where images are streamed to the client computer using a buffering system.

13. The method of claim 12, where the buffering system is based on monitoring user interaction and anticipating a next image that will be requested by the client computer.

14. The method of claim 13, where $b_{limit}$ is used to compute a lossy compression rate.

15. The method of claim 14, where the lossy compression rate is used to calculate a compression ratio.

16. The method of claim 15 where one or more compressed images are streamed with the compression ratio.

17. The method of claim 15, where a target compression quality is defined by a user, where a first image is streamed with a first compression quality, where the first compression quality minimizes network latency during interaction based on bandwidth monitoring and where the first image is streamed with a second compression quality when the user stops interacting, where the second compression quality is greater than the first compression quality if the first compression quality is lower than a target compression quality.

18. A method comprising:
determining a congestion window including:
  sending a request for a first image from a client computer to a server, including inserting a first timestamp message into the request for a first image at an application level;
  receiving the first timestamp message at the server;
  sending a second timestamp message from the server to the client computer, including inserting a second timestamp into the second timestamp message;
  calculating a first time for the first timestamp message to be sent from the client computer to the server, and calculating the send bandwidth at the server ($b_{send}$) in bytes/msec, where the first time is used to compute $b_{send}$ and a second time for the second timestamp message to be sent from the server to the client computer, and calculating the read bandwidth ($b_{read}$) in bytes/msec, where $b_{read}$=C/T, where C (the total number of bytes that were sent from server to client)=$c_i$−$c_{i-1}$, is an amount of data that was sent in a time between a last two second timestamp messages ($c_i$, $c_{i-1}$), and T=$t_i$−$t_{i-1}$+$d_i$−$d_{i-1}$, where T (the server time in msec) is equal to the time elapsed on the server between the last two second timestamp messages ($t_i$, $t_{i-1}$), $t_i$−$t_{i-1}$, and where $d_i$ and $d_{i-1}$ are differences between client computer time and server time when one or more second time stamp messages arrived at the client computer; and
  calculating the congestion window based on one or more of the first time, the second time, $b_{read}$ and $b_{est}$, and $b_{send}$ and $b_{est}$; and sending a second image before the second image is requested based on a congestion window less than a maximum congestion window.

* * * * *